UNITED STATES PATENT OFFICE.

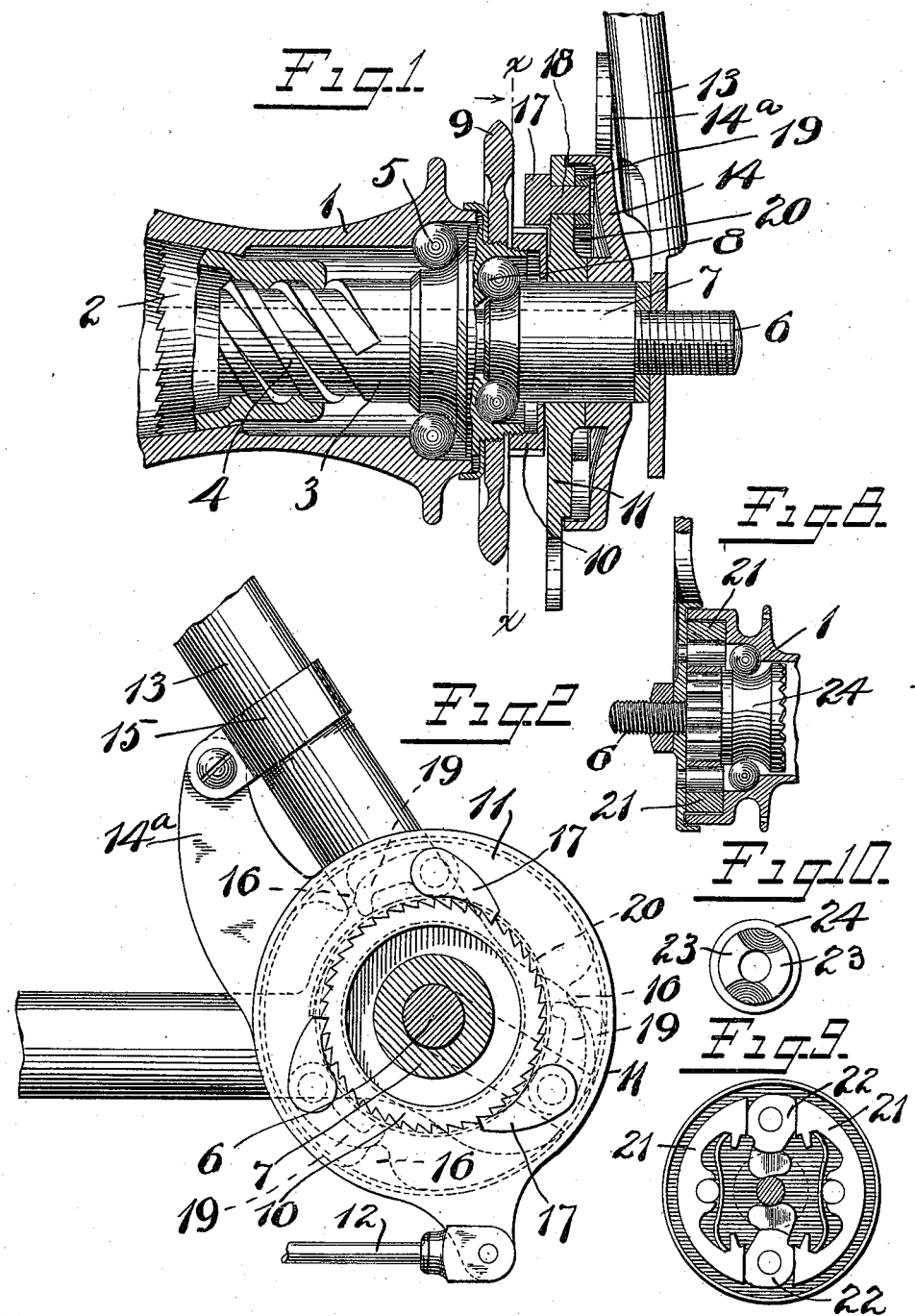

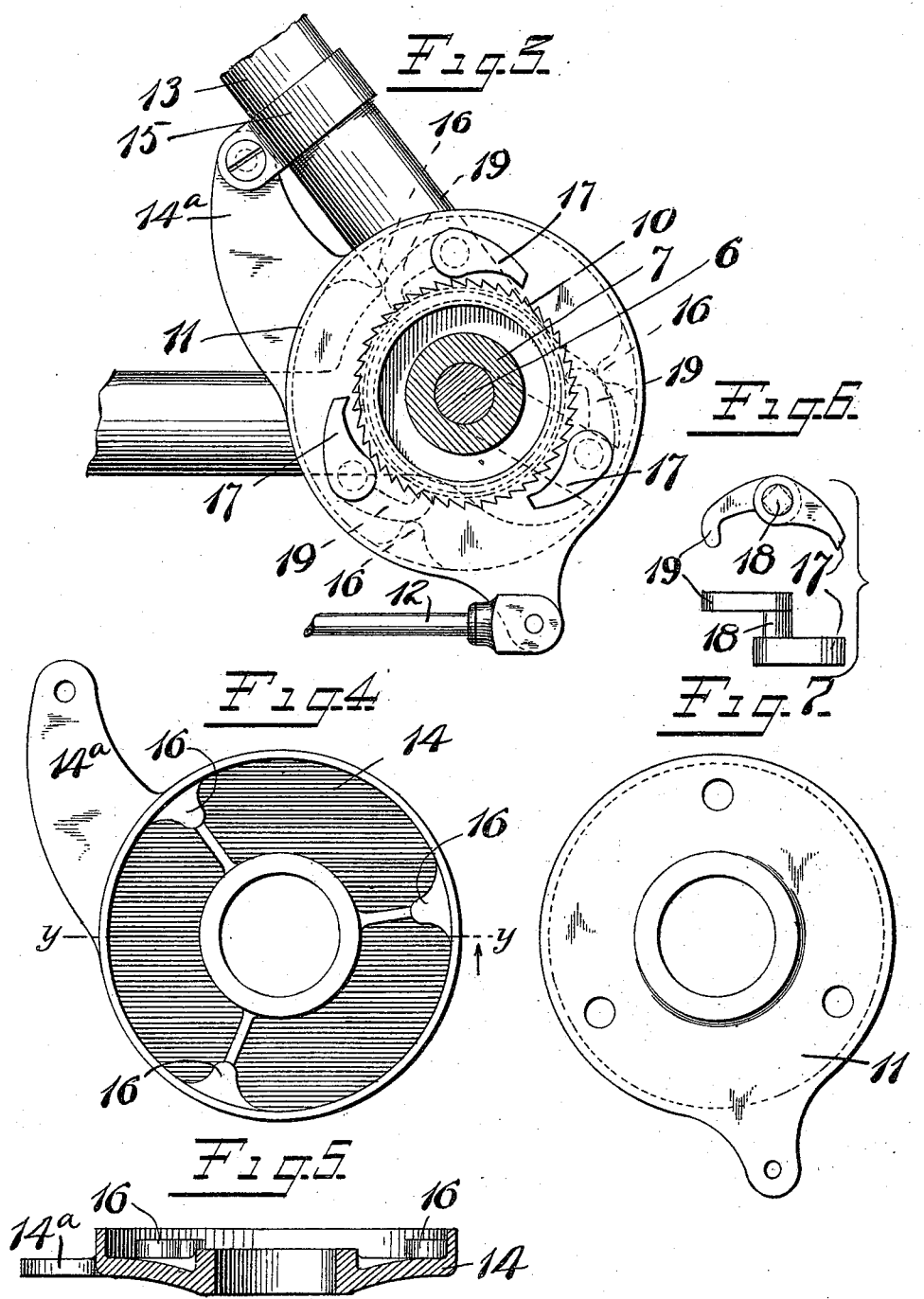

WILLIAM ALLEN BARTELS, OF ERIE, PENNSYLVANIA, ASSIGNOR TO CHARLES GLOVER, OF NEW BRITAIN, CONNECTICUT.

COASTER-BRAKE.

975,389. Specification of Letters Patent. Patented Nov. 15, 1910.

Application filed April 27, 1910. Serial No. 558,040.

*To all whom it may concern:*

Be it known that I, WILLIAM ALLEN BARTELS, a citizen of the United States, residing at Erie, county of Erie, State of Pennsylvania, have invented certain new and useful Improvements in Coaster-Brakes, of which the following is a full, clear, and exact description.

My invention consists in an auxiliary coaster brake operating device arranged for manual operation whereby in the event of breakage of the sprocket chain or foot driving means, ordinarily employed for the operation of the coaster brake, said auxiliary means is available to be operated by the driver to check the vehicle.

This apparatus is adapted to any of the usual forms of foot or pedal controlled coaster brakes, so-called, examples of which may be found in U. S. Letters Patent No. 691,541, of January 21, 1902, and No. 735,087, of August 4, 1903.

In the drawings—Figure 1 is a longitudinal sectional view of part of a bicycle hub and frame, together with associated parts. Fig. 2 is a section on the line X—X, looking in the direction of the arrow. Fig. 3 is a similar view showing the parts in a different position from that indicated in Fig. 2. Figs. 4, 5, 6 and 7 are detail views of parts of the auxiliary brake controller. Fig. 8 is a longitudinal sectional view of the hub brake on a relatively reduced scale. Fig. 9 is an inner end view of the brake shoes and associated parts. Fig. 10 is an end elevation of the brake actuator.

In the particular form of my invention, which I have elected to show herein, will be shown a preferred embodiment of the various structural details.

1 represents the driving wheel hub.

2 represents what in this instance is a combined hub clutch and brake actuator.

3 represents a support for the clutch 2, said parts being connected by a spiral thread 4.

5 is an anti-friction bearing between the support 3 and the hub 1.

6 is the usual center bolt. 7 is a cone adjustable thereon.

8 is an anti-friction bearing between the cone 7 and the outer end of the clutch support 3.

9 is the drive or sprocket.

10 is a ratchet wheel fixed on the clutch support 3 outside the driver 9.

11 is a pawl carrier rotatably mounted on the cone 7.

12 represents conventionally a handle for the pawl carrier 11 and by which the same may be manually shifted for the purpose hereinafter described.

13 represents a part of the vehicle frame.

14 is a stationary abutment member which may have an arm 14$^a$ whereby said abutment may be held from turning by connecting said arm with the frame 13 as by a band 15.

16—16 are pawl releasing shoulders on the abutment 14.

In the drawings, three pawls 17—17—17 are shown but a detailed description of one will be sufficient for all. Referring to Fig. 6, it will be seen that the pawl 17 is connected by shaft 18 to a tail piece 19, said pawl standing on one side of the carrier 11, said tail piece on the opposite side thereof.

20 is a spring normally operating to move the pawls toward the ratchet wheel 10.

Referring to Figs. 8 to 10, the brake mechanism will be seen to comprise two brake shoes 21 arranged on opposite sides of two cams 22, the ends of which cams are arranged between the two shoulders 23—23 of a rotatable coupling 24. In the particular form shown the end of the coupling 24 and the adjacent end of the actuator 2 are toothed whereby said parts may be locked together.

The brake mechanism described is well understood and is similar to that shown in the patents above referred to and is set forth herein simply as illustrative of one form of brake mechanism which may be effectively operated by the auxiliary brake controlling means.

Operation: As is customary in vehicles wherein coaster brake hubs are employed, a chain is used connecting the driver sprocket 9 with the usual power sprocket (not shown). When the driver 9 is turned in a forward direction it rotates the support 3, thus drawing the clutch 2 into driving engagement with the hub 1, simultaneously disconnecting it from the brake coupling 24. As long as power is being applied in a forward direction through the driver 9, the clutch 2 remains in engagement with the hub, whereby the driver 9 and hub 1 move together. When, however, it is desired to apply the brake, the driver 9 is stopped and reversed. This shifts the clutch 2 out of engagement with the hub 1 and brings it into engagement with the coupling 24, whereupon a continued reversal of the driver 9 operates the brake shoes 21, forcing them against the hub 1 in such a manner as to resist forward motion. If by chance the power connection with the driver 9 should be broken, or indeed if the driver 9 should become broken, it is obvious that the driver would be in peril in the absence of other means to apply the brake. To that end I have provided an effective auxiliary means whereby said braking action may be secured by means independent of the driver 9. To put this auxiliary means into operation requires merely the pulling forward of the carrier rod 12 from the position shown in Fig. 3 to that shown in Fig. 2. In the former figure, the tail pieces 19 of the several pawls are engaged under the pawl releasing shoulders 16, tilting the pawls out of engagement with the ratchet 10. When, however, the carrier 11 is shifted as described the spring 20 operates to throw the pawls into engagement with the ratchet as soon as the tail pieces 19 leave the shoulders 16. When the pawls thus engage with the ratchet a continued rotation of the pawl carrier 11 rotates the clutch support 3 in a direction to apply the brake as before.

What I claim is:

1. In coaster brake apparatus, a hub, brake mechanism therefor, two independent manually operable means for operating said brake mechanism.

2. In coaster brake apparatus, a hub, brake mechanism, two independent manually operable means for operating said brake mechanism, one of said means being normally out of operative engagement therewith, the other being normally in engagement therewith.

3. In coaster brake apparatus, a hub, a brake combined hub and brake clutch, two independent manually operable means for operating said clutch for braking purposes, one of said means including a rotatable hub driver, with connections between said driver and said brake to operate said brake when said driver is rotated in a reverse direction, and means independent of said driver for performing the same work on the same mechanism.

4. In coaster brake mechanism, a hub, a manually operable rotatable driver, said hub being capable of independent rotation relatively to said driver and arranged to be clutched therewith for simultaneous rotation in a forward direction, hub-brake mechanism operable by said driver when the latter is turned in a reverse direction, a second manually controllable means for operating said brake mechanism without the assistance of the driver.

5. In coaster brake mechanism, a hub, a manually operable rotatable driver, said hub being capable of independent rotation relatively to said driver and arranged to be coupled therewith for simultaneous rotation in a forward direction, a brake-actuator operable by said driver when the latter is turned in a reverse direction, a second manually controllable means for operating said brake-actuator without the assistance of the driver and including ratchet and pawl mechanism.

6. In coaster brake mechanism, a hub, a manually operable rotatable driver, said hub being capable of independent rotation relatively to said driver and arranged to be coupled therewith for simultaneous rotation in a forward direction, a brake-actuator operable by said driver when the latter is turned in a reverse direction, a second manually controllable means for operating said brake-actuator without the assistance of the driver and including ratchet and pawl mechanism, a rotatable carrier for the pawl element of said ratchet and pawl mechanism, and means for normally holding said pawl element out of engagement with said ratchet element.

7. In coaster brake mechanism, a hub, a hub clutch and brake actuator arranged axially therein for movement with, and independent of, said hub, means for controlling said brake-actuator, said means including a support extending into said hub, a driver on said support outside of said hub whereby said support may be rotated in either direction, an auxiliary operating means for said brake-actuator, said auxiliary means being operable independently of the driver, with means for connecting the same to said support to rotate the latter in the proper direction by manual manipulation to control said brake-actuator and to apply braking action to said hub.

8. In a coaster brake apparatus, a hub, a brake, mechanism mounted within said hub for setting said brake, and means operable by back-pedaling for actuating said brake-setting mechanism, in combination with auxiliary manually operable means for actuating said brake-setting mechanism.

WILLIAM ALLEN BARTELS.

Witnesses:
MARY E. BROWN,
WM. P. HAYES.